(12) United States Patent
Alzamora et al.

(10) Patent No.: US 8,359,782 B1
(45) Date of Patent: Jan. 29, 2013

(54) FISHING LURE DEVICE

(76) Inventors: Jason L. Alzamora, Naples, FL (US);
Gerardo Alzamora, Naples, FL (US)

( * ) Notice: Subject to any disclaimer, the term of this patent is extended or adjusted under 35 U.S.C. 154(b) by 107 days.

(21) Appl. No.: 12/953,890

(22) Filed: Nov. 24, 2010

(51) Int. Cl.
*A01K 85/02* (2006.01)
*A01K 85/14* (2006.01)

(52) U.S. Cl. .................. 43/42.44; 43/42.09; 43/42.5

(58) Field of Classification Search .......... 43/42.08, 43/42.09, 42.11, 42.13, 42.44, 42.5
See application file for complete search history.

(56) References Cited

U.S. PATENT DOCUMENTS

| | | | |
|---|---|---|---|
| 281,083 A | 7/1883 | Kessler | |
| 2,235,331 A | 3/1941 | Pugh | |
| 2,312,585 A | 3/1943 | Piro, Jr. | |
| 2,313,572 A * | 3/1943 | Nungesser | 43/42.09 |
| 2,605,571 A * | 8/1952 | Fasano et al. | 43/36 |
| 2,605,575 A * | 8/1952 | Ebert | 43/42.1 |
| 2,643,479 A * | 6/1953 | Stevenson | 43/36 |
| 2,663,964 A | 12/1953 | Martin | |
| 2,728,160 A * | 12/1955 | Franklin | 43/42.28 |
| 2,791,859 A | 5/1957 | Wentworth | |
| 2,892,280 A * | 6/1959 | Davis | 43/42.5 |
| 2,906,053 A * | 9/1959 | Eales et al. | 43/42.51 |
| 2,978,829 A * | 4/1961 | Netherton et al. | 43/42.22 |
| 3,055,138 A * | 9/1962 | Mutti | 43/42.13 |
| 3,771,251 A * | 11/1973 | Stamy | 43/42.32 |
| 3,867,780 A * | 2/1975 | Litzinger | 43/42.5 |
| 4,202,127 A * | 5/1980 | Marek | 43/42.31 |
| 4,628,629 A * | 12/1986 | Rocchietta et al. | 43/42.19 |
| 4,641,455 A * | 2/1987 | Johnson | 43/42.13 |
| 5,003,723 A * | 4/1991 | Dutcher et al. | 43/42.13 |
| 5,107,615 A * | 4/1992 | Shaffer | 43/42.41 |
| 5,133,146 A * | 7/1992 | Stecher | 43/42.5 |
| 5,829,183 A | 11/1998 | Guerin | |
| 6,082,037 A * | 7/2000 | Malouf et al. | 43/42.14 |
| D475,760 S | 6/2003 | Betker | |
| 7,254,916 B2 * | 8/2007 | Mussot | 43/35 |
| 2004/0231224 A1 * | 11/2004 | Usui | 43/42.03 |

* cited by examiner

*Primary Examiner* — David Parsley

(57) ABSTRACT

A fishing lure device featuring a hook base with a neck aperture disposed in the first end and a pair of curved hooks extending from the second end. The hooks have outer ends that are generally pointed, sharp, or bevelled. A first blade is disposed on the hook base, and a second blade is pivotally attached to the first blade via a hinge. The hooks of the hook base curve upwardly over the second blade. The second blade can move between multiple positions including a down position wherein the second end of the second blade is pushed toward a top surface of the first blade and an up position wherein the second end of the second blade is pivoted upwardly away from the top surface of the first blade. The hinge biases the second blade in the up position.

2 Claims, 3 Drawing Sheets

FISHING LURE DEVICE

FIELD OF THE INVENTION

The present invention is directed to a fishing lure for attracting and catching fish, more particularly to a fishing lure with a pair of panels attached to hooks, the panels can move to resemble wounded baitfish.

BACKGROUND OF THE INVENTION

Lures are commonly used for fishing to help increase a fisherman's success. The present invention features a novel fishing lure device with a pair of hooks attached to a pair of blades or panels that are pivotally connected by a spring hinge. The panels can pivot when the device is dragged through the water, creating motion that resembles a wounded baitfish. When a fish bites on the lure device, the spring hinge (panels/blades) is compressed, and the lure device is hooked to the mouth of the fish to catch the fish.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1A:
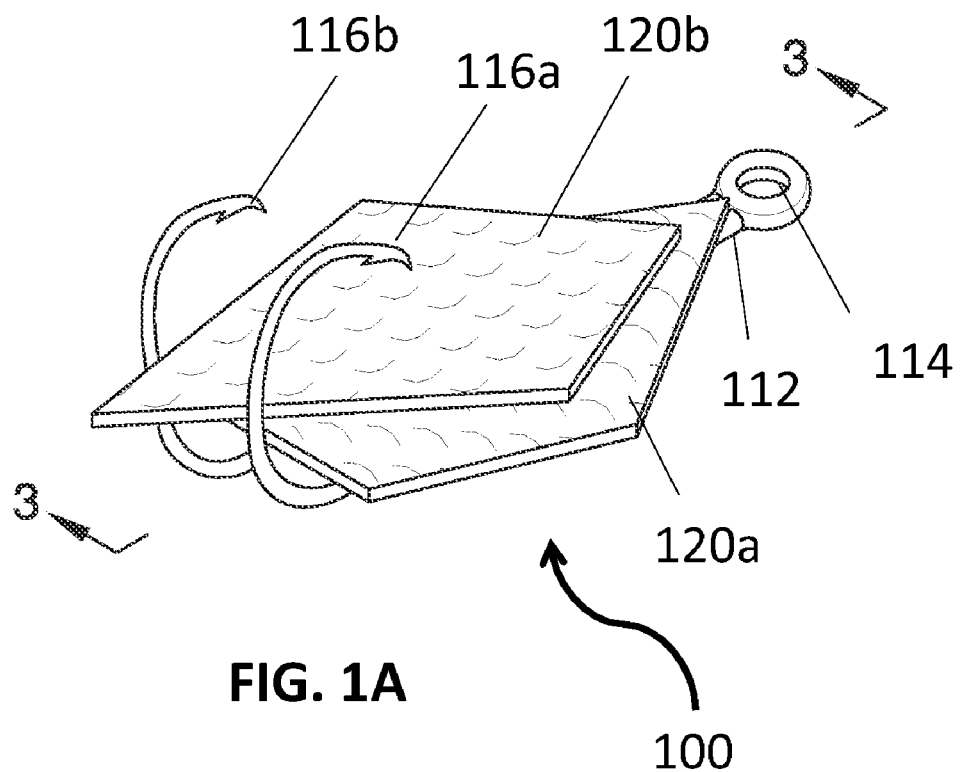
FIG. 1A is a first perspective view of the device of the present invention.
Figure 1B:
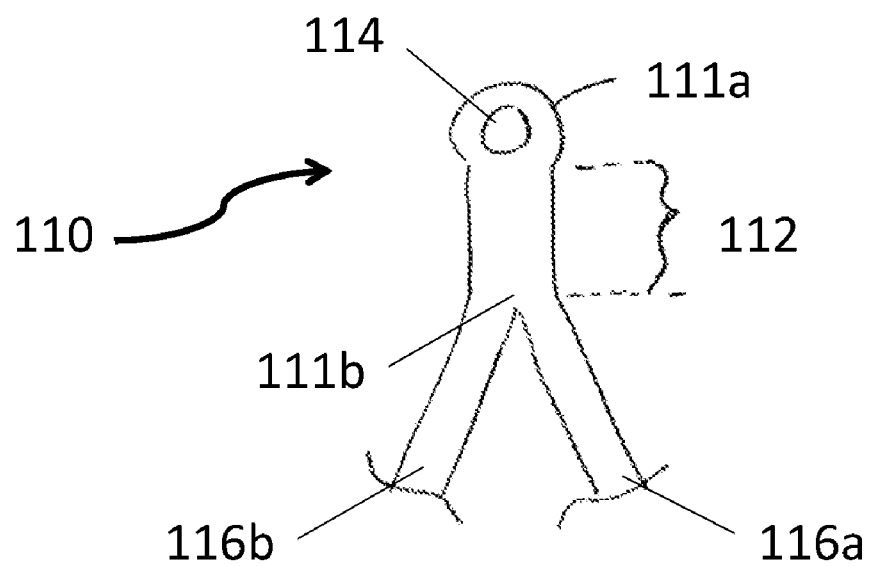
FIG. 1B is a detailed view of the hook base of the device of the present invention.

Referring now to FIGS. 1-4, the present invention features a fishing lure device 100. The device 100 of the present invention features a hook base 110. The hook base 110 has a neck 112 with a first end 111a and a second end 111b. Disposed in the first end 111a of the neck 112 is a neck aperture 114. A user can thread a fishing line through the neck aperture 114. Extending from the second end 111b of the neck is a first curved hook 116a and a second curved hook 116b, the hooks 116 being generally parallel to each other. The outer ends of the hooks 116 are pointed, sharp, or beveled like standard fishing hooks well known to one of ordinary skill in the art.

Disposed on the top surface of the hook base 110 (e.g., on the top surface of the neck 112 of the hook base 110) is a first blade 120a. The first blade 120a is generally flat and has a top surface 121, a bottom surface 122, a first end facing the first end 111a of the neck 112 of the hook base 110 and a second end. The bottom surface 122 is touching the neck 122 of the hook base 110. The hooks 116 of the hook base 110 curve upwardly over the first blade 120a (a space exists between the outer ends of the hooks 116 and the first blade 120a).

A second blade 120b is pivotally attached to the first blade 120a via a hinge 310 (e.g., spring hinge). The second blade 120b is generally flat and has a top surface, a bottom surface, a first end facing the first end 111a of the neck 112 of the hook base 110 and a second end (the second end may be positioned between the two hooks 116). The hooks 116 of the hook base 110 curve upwardly over the second blade 120b (a space exists between the outer ends of the hooks 116 and the second blade 120b). The hinge 310 (e.g., spring hinge) is sandwiched between the blades 120. The second blade 120b can move between multiple positions including but not limited to a down position wherein the second end of the second blade 120b is pushed toward the top surface of the first blade 120a (e.g., contacting the first blade 120a) and an up position wherein the second end of the second blade 120b is pivoted upwardly away from the top surface of the first blade 120a. The hinge 310 (e.g., spring hinge) biases the second blade 120b in the up position (e.g., see FIG. 3). Movement of the second blade 120b between the up and down positions (e.g., as a person pulls the device 100 through the water), may resemble a wounded or distressed baitfish and may lure other larger fish to attack and bite the device 100.

Figure 2:
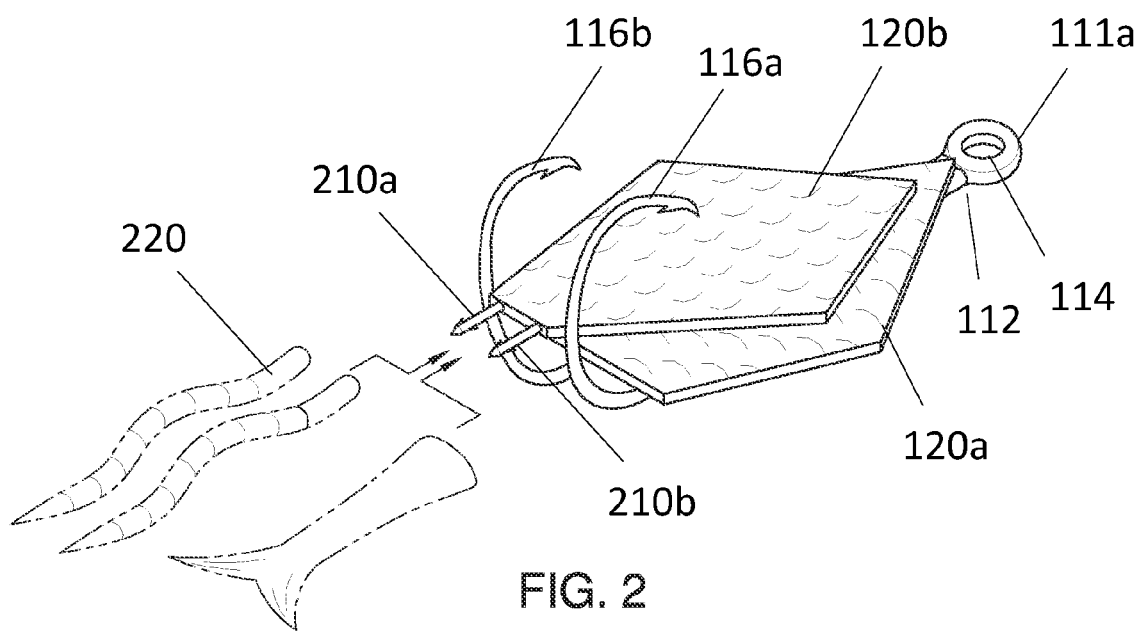
FIG. 2 is a second perspective view of the device of the present invention.
Figure 3:
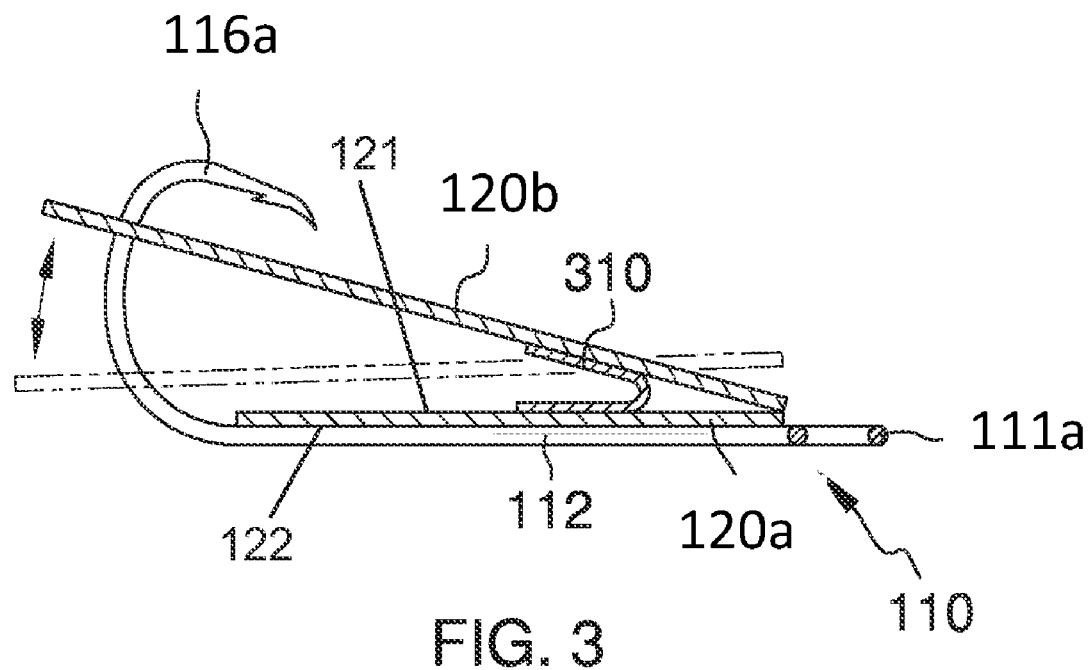
FIG. 3 is a side cross sectional view of the device of FIG. 1.

As shown in FIG. 2, in some embodiments, a first attachment component 210a is disposed on the second blade 120a at or near the second end. In some embodiments, a second attachment component 210b is disposed on the second blade 120a at or near the second end. In some embodiments, the attachment components 210 are barbed prongs (as shown in FIG. 2). Lures 220 or other items may be attached to the attachment components 210 to help further attract fish.

In some embodiments, the device 100 of the present invention is constructed from a material comprising metal, plastic, wood, the like, or a combination thereof.

Figure 4:
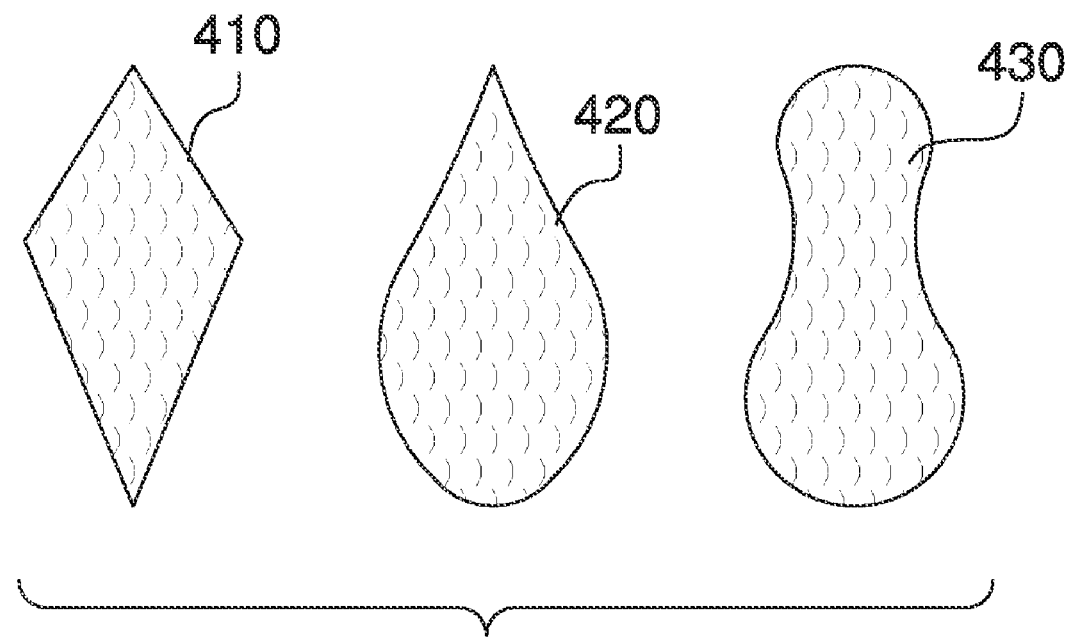
FIG. 4 is a top view of alternative embodiments of the blades of the device of the present invention.

In some embodiments, the device 100 of the present invention (e.g., the first blade 120a and/or second blade 120b) has a silver-like or reflective finish. In some embodiments, the device 100 of the present invention (e.g., the first blade 120a and/or second blade 120b) has a textured or dimpled finish. The first blade 120a and second blade 120b may be constructed in a variety of shapes. For example, as shown in FIG. 4, the first blade 120a and/or second blade 120b may be constructed in a generally diamond-like shape 410, a generally tear drop-like shape 420, a rounded or oval-like shape 430, the like, or a combination thereof. The present invention is not limited to the aforementioned shapes.

The disclosures of the following U.S. patents are incorporated in their entirety by reference herein: U.S. Pat. No. 2,235,331; U.S. Design Pat. No. D475,760; U.S. Pat. No. 281,083; U.S. Pat. No. 5,829,183; U.S. Pat. No. 2,791,859; U.S. Pat. No. 2,312,585; U.S. Pat. No. 2,663,964.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A fishing lure device comprising:

(a) a hook base 110 having a neck 112 with a first end 111a and a second end 111b, a neck aperture 114 disposed in the first end 111a of the neck 112, and a first curved hook 116a and a second curved hook 116b each extending from the second end 111b of the neck 112, the hooks 116 being generally separated by a predetermined distance, wherein outer ends of the hooks 116 are pointed, sharp, or bevelled;

(b) a first blade 120a disposed on a top surface of the neck 112 of the hook base 110, the first blade 120a is generally flat having a top surface 121, a bottom surface 122 and a first end facing the first end 111a of the neck 112 of the hook base 110;

(c) a second blade 120b pivotally attached to the first blade 120a via a hinge 310, the second blade 120b is generally flat and has a first end facing the first end 111a of the neck 112 of the hook base 110 and a second end, the hooks 116 of the hook base 110 curve upwardly over the second blade 120b, the second blade 120b can move between multiple positions including a down position wherein the second end of the second blade 120b is pushed toward a top surface of the first blade 120a and an up position wherein the second end of the second blade 120b is pivoted upwardly away from the top surface of the first blade 120a, the hinge 310 biases the second blade 120b in the up position, wherein a first barbed prong 210a and a second barbed prong 210b are disposed on the second blade 120a at or near the second end;

wherein the first hook 116a and second hook 160b are curved towards a top surface 121 of the first blade 120a such that the hook ends of both hooks point toward the first blade 120a.

2. The device of claim 1, wherein the second end of the second blade 120b is positioned between the two hooks 116.

* * * * *